Figure 5:
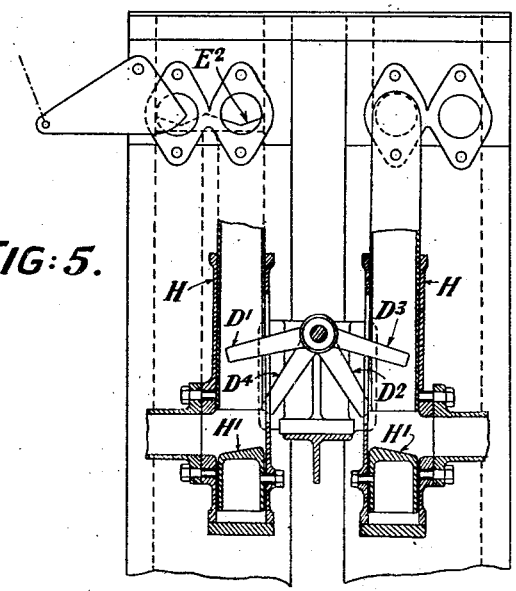

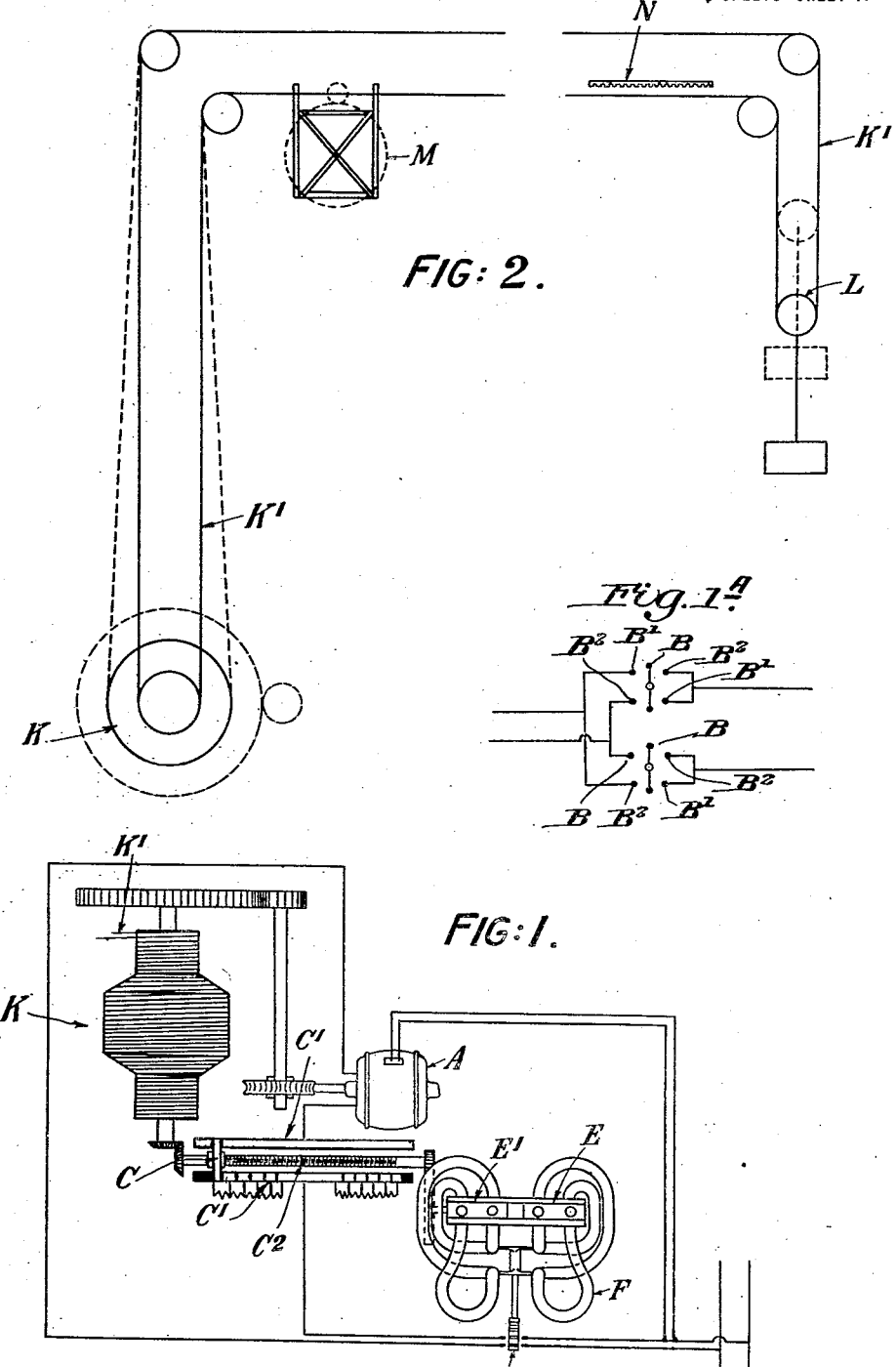

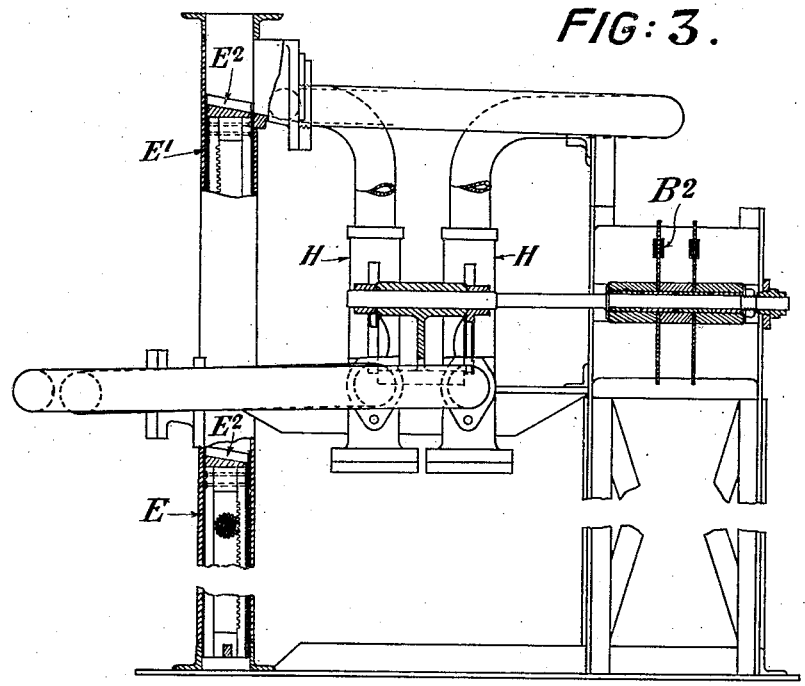
FIG: 3.
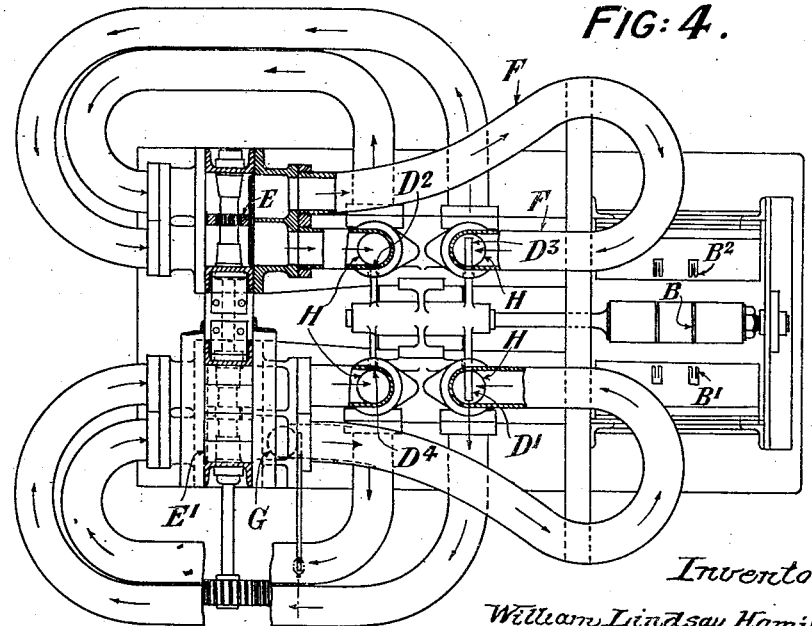
FIG: 4.
Inventor:
William Lindsay Hamilton,
By T. Walter Fowler
atty.

W. L. HAMILTON.
SYSTEM OF CONTROLLING MOTORS AND THE LIKE.
APPLICATION FILED MAR. 29, 1915.

1,237,329.

Patented Aug. 21, 1917.
3 SHEETS—SHEET 3.

Inventor.
William Lindsay Hamilton.
By T. Walter Fowler,
atty.

UNITED STATES PATENT OFFICE.

WILLIAM LINDSAY HAMILTON, OF GLASGOW, SCOTLAND.

SYSTEM OF CONTROLLING MOTORS AND THE LIKE.

1,237,329.  Specification of Letters Patent.  Patented Aug. 21, 1917.

Application filed March 29, 1915. Serial No. 17,707.

*To all whom it may concern:*

Be it known that I, WILLIAM LINDSAY HAMILTON, a subject of the King of Great Britain and Ireland, and resident of 81 Mitchell street, Glasgow, Scotland, have invented new and useful Improvements in or Connected with Systems of Controlling Motors and the like and in or Connected with Motor-Driven Apparatus, of which the following is a specification.

This invention refers to new or improved systems of controlling motors and the like, hereinafter referred to as motors, under conditions where a motor is required to effect a definite drive in what will be termed a forward direction, power being generated sufficient to start the drive and, if required, subsequently be increased and maintained constant for a period, then reduced, the drive stopped, and the direction of drive reversed, power generated sufficient to restart the drive and, if required, subsequently increased and maintained constant for a period, then reduced and the drive finally stopped.

This invention is particularly applicable under conditions where the drive is effected by an electric motor, although the invention is also adapted to be used under conditions where the motive power is obtained from other sources of energy, such, for example, as fluid pressure, steam, compressed air, internal combustion, or the like.

According to this invention the application of the power required for starting the drive in the forward direction may be initially controlled by hand actuation, and the subsequent operations up to and including the stopping of the drive at its termination in the reverse direction may be effected entirely automatically, although, if required, at any stage the drive may be interrupted by hand actuation.

The system of increasing the power after the drive in either direction has been started may be governed by the operation of the motor, for example, in the case of an electric motor, the operation of the motor may cause one or more resistances to be cut out at the commencement of the drive and the motor permitted to operate for a period with the resistance or all of them removed, and a resistance or a number of them may be introduced or reintroduced as the drive approaches its completion.

In the case of a steam or other fluid pressure motor or the like it will be recognized that a system of valve or other control can be introduced which will give the same control over the increase and reduction of power.

The system of reversing the drive may, for example, in the case of an electric motor be made by stopping the motor at the completion of the drive in the forward direction, and restarting the motor in the reverse direction by means of a switch. It will, however, be recognized that the drive in the forward direction may be stopped by disconnecting the motor from the driving gear, and the drive in the reverse direction effected by means of reversing gear.

The method of controlling the initial distribution of power and the reversal of the drive may, in accordance with this invention, be effected by a gravitation system, an example of which, for use in conjunction with an electric motor directly connected to the driving gear, and which at the completion of the drive in the forward direction is required to be stopped for a period before the necessary connections are made to restart it in the reverse direction, will now be described with reference to the accompanying drawings, in which:—

Figure 1 is a plan showing a general arrangement according to this invention, and Fig. 2 is an elevation of a part thereof.

Fig. 1$^A$ is a diagram of a switch and its contacts forming part of the arrangement shown at Fig. 1 to be hereinafter described.

Figure 6:
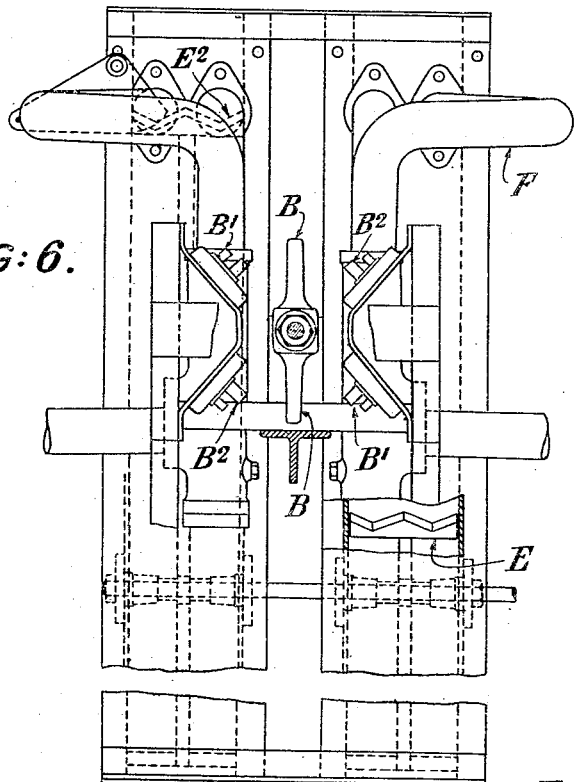

Fig. 3 is a sectional elevation, Fig. 4 is a sectional plan, and Figs. 5 and 6 are end sectional elevations illustrating a gravitation escapement and electric switch apparatus.

In the arrangement illustrated, one or more resistances are so arranged in circuit with the motor A that upon the mains being closed by a starting switch B, the resistance if one only is provided or all of them if a number is provided are introduced, the resistance or resistances being subsequently cut out by a traveling contact which is driven by a connection with the motor. For example, the contact may be carried upon a block C arranged to be traveled over conductor guides $C^1$ $C^1$, the travel being imparted by a screw $C^2$ driven by the motor. It will be recognized that in place of the screw $C^2$, toothed, or other system of gearing, may be adopted, and the guides $C^1$ $C^1$ instead of being straight may be arranged about a circular, segmental, or other path.

A suitable starting switch for this purpose, exemplified in B, is devised so as to establish connections as follows:—First, for the forward rotation of the motor by bridging contacts $B^1$ $B^1$. Second, for stopping the motor by standing clear of all contacts. Third, for the backward rotation of the motor by bridging contacts $B^2$ $B^2$.

The switch B is adapted to be moved from its second into its first position and bridge the contacts $B^1$ $B^1$ by direct hand actuation, or through the intermediary of a weight arranged so as to be released and act upon a lever $D^1$ to turn the switch from its second into its first position.

The continued operation of the motor A in the forward direction is arranged to operate an elevator E carrying two weights, which at the completion of the drive in the forward direction are adapted to be released, one to pass and actuate immediately upon a lever $D^2$ arranged by its actuation to place the switch B in its second position and thereby stop the motor, and the other to subsequently act upon a lever $D^3$ to move the switch from its second into its third position and thereby start the motor in its reverse direction. The interval which is required between the action of the first weight and the second weight (which are simultaneously released) on their respective levers, may be obtained by subjecting the weight which is required to come into operation at the later time to a method of escapement, which, in one form of construction, may as shown consist of a circuitous path F along which the weight travels, and in doing so occupies the interval of time required. The escapement in other cases may, for example, take the form of a fly, dash-pot resistance, or the like, illustrations of which are not included in the drawings.

The operation of the motor for effecting the drive in the reverse direction is arranged to operate a second elevator $E^1$, which may be provided with a single weight, and so arranged that, at the completion of the drive in the reverse direction, the weight is released to operate upon a lever $D^4$ and place the switch in its second position and thereby stop the motor and consequently the drive. The elevator $E^1$ may also carry a second weight adapted to be released when required by hand operated means, the weight, when released, being arranged to act upon the lever $D^1$ and thereby place the switch in its first position in order to start the motor in the forward direction.

Weights for this purpose may consist of heavy balls G composed, for example, of metal, and the elevators may be so constructed that the position in their upward travel at which the weights are released may be regulated. For example, each of the elevators shown comprises a platform $E^2$ inclined toward the front of a casing in which it travels, the balls resting upon the platform and against the front of the casing, the balls passing by gravity on to the platform when it is in its lower position, and when raised by the elevator passing from the platform over the top of the front of the casing to the levers on which they act respectively. If required, the front may be provided with a top part capable of vertical adjustment so as to regulate the position when the balls shall leave the platform $E^2$.

The weights G, after passing from the platform, and in the case of the one which is required to act after an interval of time has elapsed after having passed or traversed the escapement device, pass into vertical or steeply inclined passages H, into which the ends of the levers $D^1$ $D^2$ $D^3$ and $D^4$ are adapted to project, the levers being so arranged that the turning of one causes the lever which is next to be operated on to be turned so as to project into its respective passage. The passages at their lower ends may be provided with abutments $H^1$, cushioned, if desired, for the weights G to fall upon. Alternatively, the lower ends of the passages may be curved or otherwise formed so that in action the speed of the weights will be gradually checked.

With this system of mechanism, the stoppage of the motor A is normally dependent upon the actuation of the weights G, but as a precautionary measure, provision may be made so that in the event of the weights failing for any cause to act, the continued running of the motor is arranged to operate means for opening the circuit, for example, this may be obtained by means of the traveling contact C passing on to an insulated portion when moved beyond the normal limits of its travel at either end.

In addition to varying the power, a variation in the speed of a drive may be obtained by providing a winding drum K having a surface of equal and smallest diameter at each end and then increasing from near each end, reaching a maximum which may be maintained constant. A drum having a surface of this character is formed with a comparatively deep groove extending helically from one end of the drum to the other, and in association therewith a winding cable $K^1$ is fastened at one end to the drum and wound entirely around leaving the drum at the opposite end from where it may extend and pass around a wheel L adapted to maintain the cable in tension and return to the drum where its free end is fastened so as to wind on into the groove immediately vacated by the cable $K^1$ as its other end unwinds. The position where one part of the cable leaves the groove and the other passes on may be about half the circumference apart, or it might be more, amounting to a turn and a half, or more apart. With a drum of this description rotating at a constant speed, the speed of its travel would be least as the cable passes on and off either of the smallest ends of the drum, the speed increasing when the region of increasing diameter is reached and maintaining its highest speed when winding on and off the region of greatest diameter.

A cable drive according to this invention is particularly applicable for use in conjunction with tipping wagons arranged to be hauled out to a station, discharged, and hauled back, in a manner such, for example, as is described in the specification of the present applicant's United States Patent No. 1049709, dated 7th January, 1913, the example illustrated comprising the drum K associated with a carriage M and rack N.

I claim:—

1. Controlling means for a motor effected drive, comprising means adapted to be initially controlled by hand actuation for starting the drive in a forward direction, means for stopping the drive after a definite drive has been effected, a weight automatically released to act on the means for stopping the drive after a definite drive has been effected, a weight automatically released to act on means for restarting the drive in a reverse direction, and a weight automatically released to act on means for stopping the drive at its termination in the reverse direction.

2. Controlling means for a motor effected drive, comprising means adapted to be initially controlled by hand actuation for starting the drive in a forward direction, a first and second weight automatically released at the same time, the first to act on means for stopping the drive after a definite drive has been effected, the second to act on means for restarting the drive in a reverse direction, a circuitous path for the second weight to travel along after being released before coming into operation to restart the drive, and a third weight automatically released to act on means for stopping the drive at its termination in the reverse direction.

3. Controlling means for an electric motor effected drive, comprising a switch adapted to be initially controlled by hand actuation for starting the motor in a forward direction, a first and second weight automatically released at the same time, the first to act on means associated with the switch for stopping the motor after a definite drive has been effected, the second to act on means associated with the switch for restarting the drive in a reverse direction, a circuitous path for the second weight to travel along after being released before coming into operation on the said means to restart the motor, and a third weight automatically released to act on means associated with the switch for stopping the drive at its termination in the reverse direction.

4. Controlling means for a motor effected drive, comprising means adapted to be initially controlled by hand actuation for starting the motor in a forward direction, a first weight automatically released to act on means for stopping the drive after a definite drive has been effected, a second weight automatically released to act on means for restarting the drive in a reverse direction, an elevator actuated by the motor to raise the first and second weights into position from which they are released, and a third weight automatically released to act on means for stopping the drive at its termination in the reverse direction, and an elevator actuated by the motor to raise the third weight into position from which it is released.

WILLIAM LINDSAY HAMILTON.

Witnesses:
J. ALFRED BREWER,
M. S. THORNTON.